Sept. 14, 1926.
B. D. THOMAS
1,600,078
BALANCING MEANS FOR AIRPLANES
Filed Feb. 14, 1922
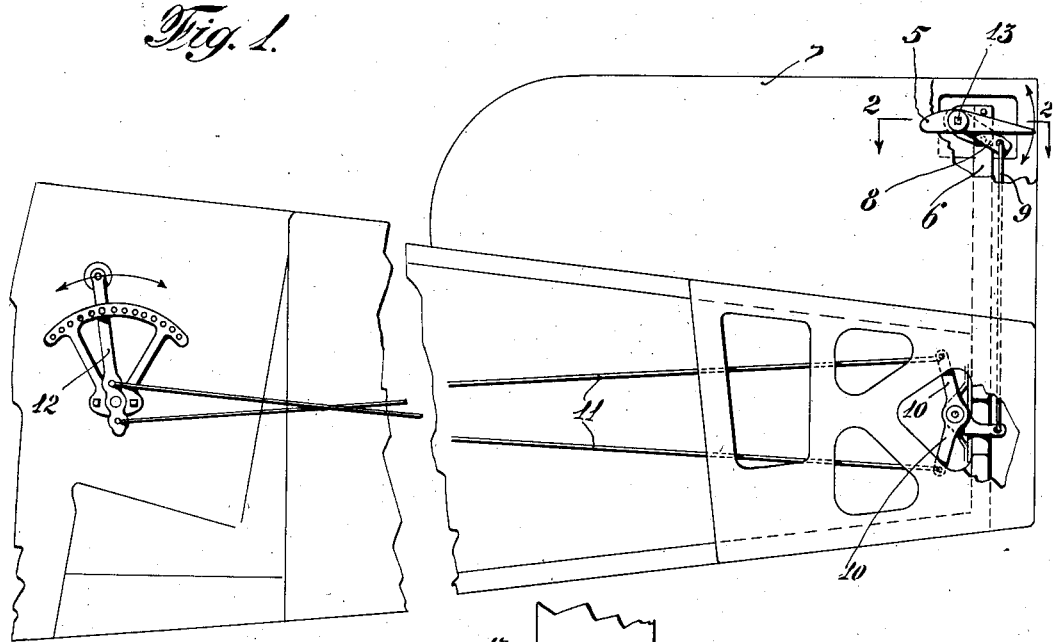
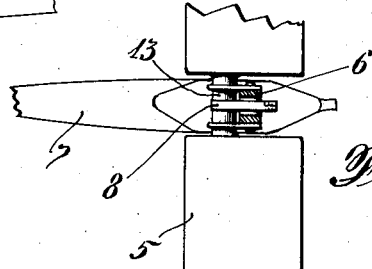
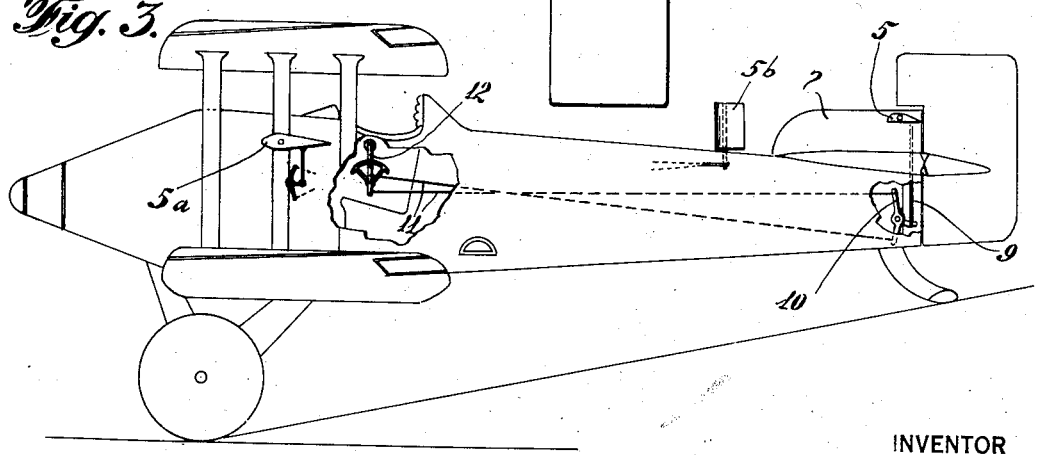
INVENTOR
Benjamin Douglas Thomas
BY   ATTORNEY
Edward H. Wright Patented Sept. 14, 1926.

1,600,078

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

BALANCING MEANS FOR AIRPLANES.

Application filed February 14, 1922. Serial No. 536,432.

This invention relates to control elements for airplanes, and more particularly to auxiliary means for maintaining the longitudinal, lateral, or directional equilibrium of the machine. Sometimes an airplane is subject to what is known as nose heaviness, or tail heaviness, due to variuos causes, and may also be out of lateral balance due to torque reaction of the propeller or to eccentric loading of the airplane, or due to directional instability, and the object of my invention is to provide a small independently operated control element, which may be termed a trimming plane, having a lifting or depressing wing section, or streamline section, as desired, suitably mounted upon the machine in order that it may be readily adjusted to the proper position to overcome the objectionable tendencies referred to.

In the accompanying drawing: Figure 1 is a side elevation of the rear portion of an airplane with parts broken away and showing one form of my improvement applied at the tail end of the machine; Fig. 2, a horizontal section taken on the line 2—2 of Fig. 1, and showing the trimming plane in plan with a portion broken away; and, Fig. 3, a side elevation of an airplane in outline, and showing both rear, side, and vertical trimming planes.

In order to preserve the longitudinal stability, in accordance with my improvement, a small auxiliary control element, or trimming plane, 5, is mounted at the tail end of the fuselage, this element being in addition to the usual supporting wings and control members, such as wings, ailerons, elevator, stabilizer, rudder, etc. The trimming plane may be mounted in any suitable manner, but as shown in the drawing, said trimming plane, 5, is pivotally mounted on a substantially horizontal axis, 13, on the stern post, 6, of the frame of the fuselage, which extends within the vertical fin, 7, the trimming plane being formed in two sections extending at either side of the fin, 7.

Any suitable mechanical connections may be provided for adjusting the position of the trimming plane upon its axis, and for this purpose I have shown an arm, 8, mounted on the axis, 13, of the trimming plane, 5, and connected by a rod, 9, with a double bell crank lever, 10, having double wire connections, 11, with the hand operated lever, 12, by which the trimming plane may be adjusted and set in the desired position by the operator. It will be noted that the mechanical connections for operating the trimming plane are all enclosed within the fuselage and vertical fin, so that they are protected from injury and are not subject to air resistance.

When, under the usual flying conditions, the airplane is subject to either nose heaviness or tail heaviness, the pilot may readily adjust the position of the small trimming plane, and then set the same in that position which entirely overcomes the objectionable tendency. Thereafter, as the troublesome element is thus removed, the pilot may direct his entire attention to the usual controls, and be relieved from the annoying conditions referred to.

In order to preserve a lateral balance under eccentric loading or certain torque reaction of the propeller, a small trimming plane, such as 5$^a$, similar to that above described, may be located in a suitable position at one side of the fuselage, as indicated in Fig. 3 of the drawing. This lateral trimming plane, 5$^a$, may also be operated by any suitable mechanical connections which are preferably independent of those operating the other trimming plane.

When the machine is out of lateral balance, this tendency may be overcome by adjusting the position of the lateral trimming plane, 5$^a$, upon its axis in a similar manner as above described.

In order to correct directional instability, due to the swirl of the propeller slip stream or other causes, a small vertical trimming or other causes, a small vertical trimming plane, such as 5$^b$, preferably of streamline section, may be located on top of the fuselage, and mounted on a vertical axis, as shown in Fig. 3, with the operating pivot rod projecting into the fuselage and operated by suitable mechanical connections, such as above described in connection with the other trimming planes.

Having now described my invention, what I claim as new and desire to secure by Letters Patent is:

1. In an airplane, the combination with the rear stabilizing plane and vertical fin, of a pair of trimming planes pivotally mounted on a horizontal shaft passing through said fin above the stabilizing plane, and means for swinging said shaft to cause said trimming planes to correct any undue nose or tail heaviness.

2. In an airplane, the combination with the main supporting wings, fuselage, stabilizing plane, and rear vertical fin, of a small trimming plane on each side of said fin above said stabilizing plane, a horizontal shaft within said fin on which said trimming planes are mounted, another trimming plane on top of the rear portion of the fuselage, a vertical shaft carrying said last mentioned plane, and independent means, enclosed within said fuselage and fin, for adjusting said trimming planes to correct any inherent tendency of the airplane to deviate either longitudinally or laterally from a straight path.

In testimony whereof I have hereunto set my hand.

BENJAMIN DOUGLAS THOMAS.